United States Patent [19]

Waddleton

[11] Patent Number: 5,417,556
[45] Date of Patent: May 23, 1995

[54] BEARING FOR GEAR PUMP

[75] Inventor: David Waddleton, Pointe Claire, Canada

[73] Assignee: AlliedSignal Inc., Morristown, N.J.

[21] Appl. No.: 207,771

[22] Filed: Mar. 8, 1994

[51] Int. Cl.⁶ ............................................. F01C 19/08
[52] U.S. Cl. .................................. 418/132; 418/135
[58] Field of Search ................ 418/131, 132, 134, 135

[56] References Cited

U.S. PATENT DOCUMENTS

| | | | |
|---|---|---|---|
| 2,665,641 | 1/1954 | Lauck | 418/131 |
| 3,294,028 | 12/1966 | Dahl | 418/132 |
| 3,490,382 | 1/1970 | Joyner | 418/132 |
| 3,664,777 | 5/1972 | Aoki | 418/131 |
| 4,097,206 | 6/1978 | Schonherr | 418/189 |

Primary Examiner—Richard A. Bertsch
Assistant Examiner—Charles G. Freay
Attorney, Agent, or Firm—Leo H. McCormick, Jr.; Larry J. Palguta

[57] ABSTRACT

A floating bearing having an oval body located in a cavity along with a fixed bearing retains a pair of intermeshing gear members in the cavity in a housing of a pump. A spacer member engages an axial rib on the oval body to form a control chamber between the spacer member and the oval body. A resilient member provides an initial force which urges the floating bearing into engagement with the pair of intermeshing gears and forms a gap between the spacer and the oval body. Entrance fluid pressure from an entrance chamber is communicated to the control chamber while discharge fluid pressure from a discharge chamber is communicated to the gap. The entrance and discharge fluid pressures act on the floating bearing to provides a secondary force which urges the floating bearing into engagement with the pair of intermeshing gears to seal the entrance chamber from the discharge chamber.

8 Claims, 1 Drawing Sheet

U.S. Patent May 23, 1995 5,417,556
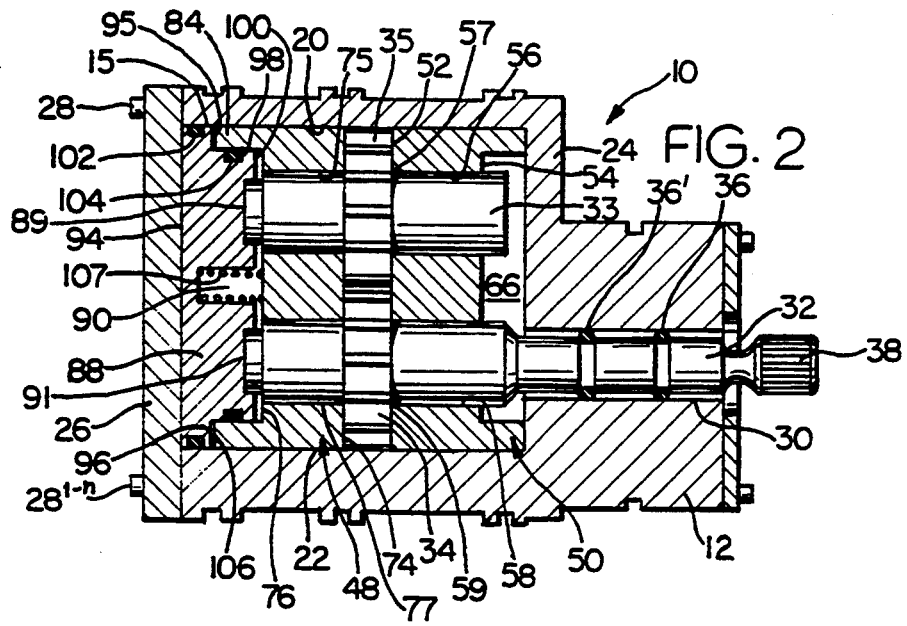
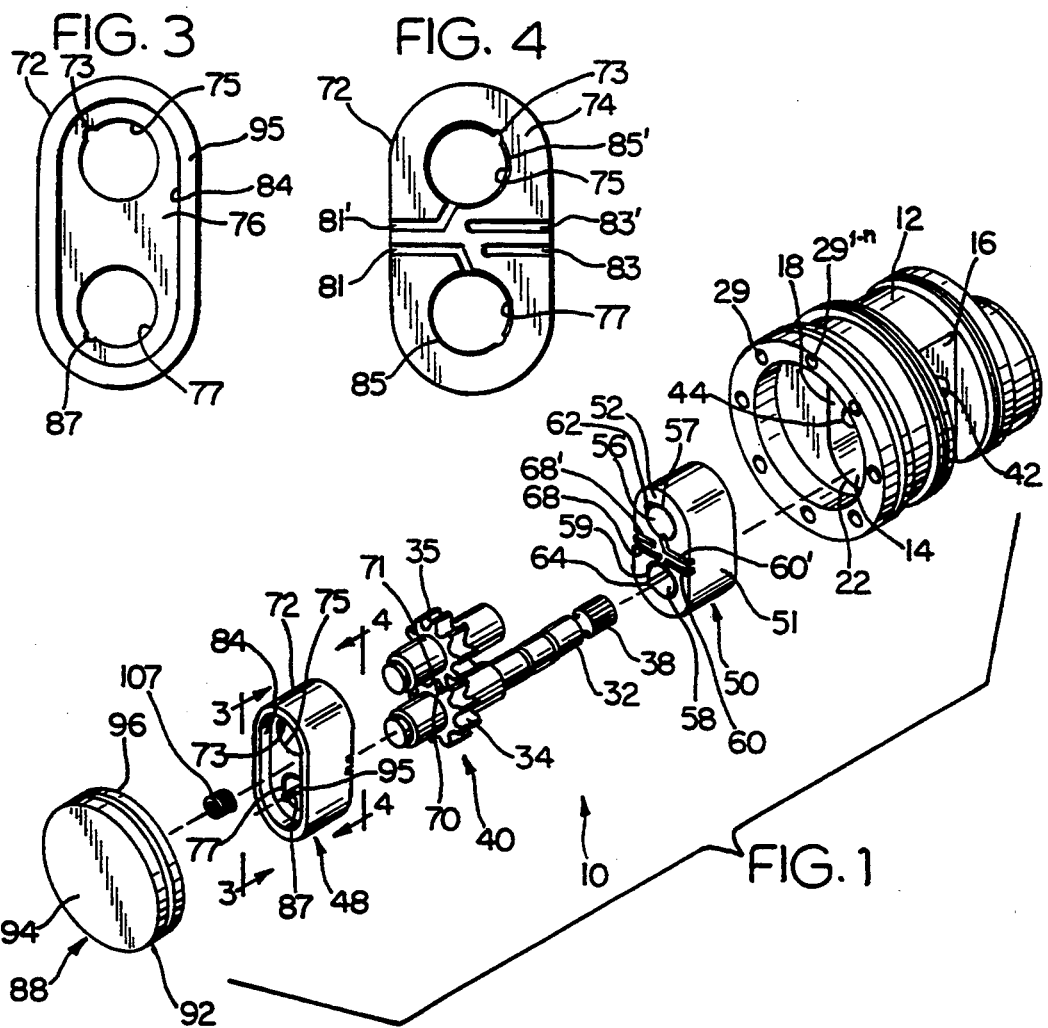

BEARING FOR GEAR PUMP

This invention relates to a floating bearing for locating a pair of intermeshing gear members in a cavity of a pump. The floating bearing is urged into engagement with the intermeshing gear members as a function of the forces generated by the entrance and discharge fluid pressures acting on controlled areas of the floating bearing.

BACKGROUND OF THE INVENTION

In a known gear pump a pair of meshed straight-cut spur gears are located in a cavity of a housing to define an entrance chamber and discharge chamber. One of the meshed gears is driven or rotated by an external power source, while the other gear is restrained within the housing as an idler and rotates because of its meshing engagement with the externally driven gear. The entrance chamber is connected to a source of fluid through an inlet port and as the meshed gears rotate fluid is drawn into the chamber as adjacent pairs of gear teeth come out of mesh. The fluid drawn-in is transported within the intertooth spaces of gear members. As adjacent pairs of gear teeth come into mesh, fluid is displaced into an exit port which is connected to this discharge chamber. Close tolerances, various seals and the mesh of the gears prevents the commingling of fluid between the entrance chamber and discharge chamber.

U.S. Pat. No. 5,076,770 discloses a floating and stationary bearing structure which seals the entrance chamber from the discharge chamber and substantially eliminates the drag torque experienced by the intermeshing gears. In this structure, pressurized fluid from the discharge chamber acts on the bearing members to provide a clamping force to seal the entrance chamber from the discharge chamber. This structure performs in a satisfactory manner for most applications and yet the wear experienced by the bearings and the loss of efficiency resulting from the clamping force may be unacceptable for some applications.

U.S. Pat. No. 5,252,047 discloses a floating bearing for a pump having a passage through which an intermediate fluid pressure from the intermeshing gears provides a clamping force to seal the entrance chamber from the discharge chamber. This structure performs in a satisfactory manner however their is an added cost in the manufacture of the floating bearing and a peripheral seal which separates the entrance chamber and the discharge chamber and can under some circumstances offer resistance to movement within the cavity.

SUMMARY OF THE INVENTION

In the present invention, a pair of intermeshing gear members are retained between a floating bearing and fixed bearing in a cavity. The gear members are rotated by an external torque applied to a shaft of one of the gears which extends through the housing. Rotation of the shaft causes fluid located in the entrance chamber to be picked up and transported around the periphery of the gear members a discharge chamber. The floating bearing has an oval body with the first and second axial bores therein which receive the corresponding first and second shafts extending from a pair of intermeshing gear members and an annular axial rib that extends from the oval body which engages a corresponding spacer member. A spring located between the spacer member and the floating bearing urges the floating bearing into engagement with the pair of intermeshing gear members to define a control chamber between the spacer member and floating bearing and a gap between a face on the annular rib of the floating bearing and the spacer member. The control chamber is in constant communication with fluid in the entrance chamber while the gap is in constant communication with the fluid in the discharge chamber. A force is created across the floating bearing as a result of a difference in the fluid pressures in the discharge chamber and the entrance chamber. This force acts on and urges the floating bearing into engagement with the pair of intermeshing gears to seal the entrance chamber from the discharge chamber.

This invention provides for a simple construction of the components of a pump while an areas on a floating bearing which sense entrance chamber pressure and discharge chamber pressure can be adjusted to optimize a clamping force for urging the floating bearing into engagement with intermeshing gears such that friction, wear and heat generation is minimized.

BRIEF DESCRIPTION OF THE DRAWINGS

FIG. 1 is an exploded isometric view of a gear pump having a floating bearing and a fixed bearing made according to the principals of this invention;

FIG. 2 is a sectional view of the gear pump of FIG. 1 with the floating bearing, intermeshing gears and the fixed bearing assembled in the housing;

FIG. 3 is a view taken along line 3—3 of FIG. 1; and

FIG. 4, is a view taken along line 4—4 of FIG. 1.

DETAILED DESCRIPTION OF THE INVENTION

The gear pump 10 shown in FIGS. 1 and 2 has a housing 12 with a cavity 14 located therein. Cavity 14 has a generally oval shape with tangential side portions 16 and 18 joined by semi-circular portions 20 and 22. An integral end wall 24 closes one end while fasteners 28, 28', ... $28^n$ extend through end plate 26 and engage correspondingly, threaded openings 29, 29', ... $29^n$ in housing 12 to close the other end of cavity 14 and form a sealed housing. End wall 24 has an axially extending bore 30 which receives shaft 32 on gear 34 of a pair of intermeshing gears 40. Sealing members 36, 36' are located in grooves on shaft 32 and engage the housing surrounding bore 30 to seal shaft 32 from the surrounding environment. End 38 of shaft 32 receives an input torque from a power source to rotate the pair of intermeshing gears 40.

Housing 12 has an inlet port 42 located approximately in the midpoint of side wall 16 and a exit port 44 located approximately at the midpoint of side wall 18. Inlet port 42 is connected to a source of fluid which may be pressurized to an initial pressure level while pressurized discharge fluid is communicated through the exit port 44. The intermeshing gears 40 engage the housing to define an entrance chamber adjacent the inlet port 42 and a discharge chamber adjacent to the exit port 44.

A pair of carbon graphite bearings 48 and 50 retain the intermeshing gears 40 in cavity 14 of housing 12. Bearings 48 and 50 have a geometrical shape which complements the general oval shape of the cavity 14 and yet have sufficient clearance to permit relative independent movement between each bearing and housing 12 over a desired operational temperature range even with different coefficients of thermal expansion than the housing 12. Bearings 48 and 50 which are similar in shape and can be reversed within the cavity 14 may move both axially and radially with respect to the cylindrical axes of surfaces 20 and 22 in cavity 14. In addition, bearings 48 and 50 could also be made of metal alloys under some operational requirements.

Bearing 50 which is located or fixed in cavity 14 adjacent end wall 24 has an oval shaped housing 51, a first axial bore 56 and second axial bore 58. The first 56 and second 58 axial bores which extend from an inner face 52 to an outer face 54 receive shaft 33 on gear 35 and shaft 32 on gear 34, respectively. Inner face 52 has slots 60', 60 which connect the entrance chamber with the chamfers 57 and 59 that surround bores 56 and 58. Slots 62 and 64 in turn connect chamfers 57 and 59 with a control chamber 66 formed between an outer or end face 54 on housing 51 and end wall 24 of housing 12. Inner face 52 has slots 68', 68 for connecting a sequentially changing high pressure chamber 70 created by the meshing of the individual teeth of gears 34 and 35 with the discharge chamber to communicate an intermeshed volume of fluid trapped by the rotation of gears 34 and 35 to the discharge chamber.

Bearing 48 is also located in and designed to float in cavity 14. Bearing 48 has an oval shaped housing or body 72 with a first end 74 and a second end 76. The oval body 72 has first 75 and second 77 axial bores that extend from the first end 74 to the second end 76. The first 75 and second 77 axial bores receive shaft 33 of gear 35 and shaft 32 of gear 34 of the pair of intermeshing gear members 40. The first end 74 of the oval body 72 which is designed to engage the intermeshing gear members 40, has first and second slots 81, 81' in the end face thereon, as shown in FIG. 4 and chamfers 85', 85 which surround the first 75 and second 77 axial bores. Slots 73 and 87 extend from face 76 and with the first and second slots 81', 81 form a continuous path between the entrance chamber and the second face 76. Slots 83, 83' are also located on the face of end 74 to communicate chamber 70 with the discharge chamber. The second end 76 of the oval shaped body 72 has an axial rib 84 that extends therefrom and with spacer member 88 forms a chamber 90 for receiving fluid from slots 73 and 87.

The spacer member 88 has a first substantially cylindrical peripheral surface 92 that extends from a first end 94 to a shoulder 96 and a second substantially oval surface 98 that extends from shoulder 96 to a second end 100. A seal 102 on surface 92 engages surface 15 of housing 12 while seal 104 on surface 98 engages the interior of the axial rib 84. The spacer member 88 has first 89 and second 91 blind axial bores that are aligned with the first 75 and second 77 bores in the oval body 72 of bearing 48. The first axial bore 89 receives an extension from shaft 33 of gear 35 while the second axial bore 91 receives an extension from shaft 32 of gear 34 to assist in locating the pair of intermeshing gear members 40 in cavity 14.

A spring or resilient member 107 located in control chamber 90 acts on bearing 48 to urge end 74 into engagement with the intermeshing gear members 40 while at the same time defining a gap 106 between shoulder 96 on spacer member 88 and end face 95 on the axial rib 84 extending from oval body 72 of bearing 48. The control chamber 90 is connected through first 75 and second 77 axial bores of bearing 48 to receive fluid from the entrance chamber while gap 106 is connected to the discharge chamber along a flow path formed by the dimensional clearance between bearing 48 and tangential side wall 18 to receive fluid having discharge chamber pressure when the intermeshing gears 40 are rotated. The difference in the fluid pressure between the fluid in the entrance chamber and discharge chamber creates a force across oval body 72 as a function of the surface area of end face 95. This force acts in a direction such that bearing 48 is urged into engagement with the pair of intermeshing gears 40 to seal the entrance chamber from the discharge chamber.

MODE OF ASSEMBLY OF THE INVENTION

The fixed bushing 50 is placed on shafts 32 and 33 of the pair of intermeshing gears 40 and thereafter inserted in housing 12 with the oval shaped bodies 51 and 72 engaging the oval surface of cavity 14. Spring 107 is located in spacer member 88 and oval surface 98 brought into engagement with the interior surface of axial rib 84 that extends from bearing 48. As surface 98 moves into the interior surface of axial rib 84, seal 104 engages the interior surface to define and seal control chamber 90 from gap 106 formed between surface 95 on axial rib 84 and end 100 on spacer member 88. Bolts 28,28'... $28^n$ are located in end plate 26 and engage corresponding threaded openings 29, 29'... $29^n$ in housing 12 to define a sealed structure for pump 10. When assembled, spring 107 provides a initial clamping force which holds floating bearing 48 against the pair of intermeshing gears 40 and the pair of intermeshing gears 40 against the fixed bearing 50 to seal chambers 66 and 90 from the discharge chamber.

MODE OF OPERATION OF THE INVENTION

When an input torque is applied to the end of 38 of shaft 32, gear 34 rotates and gear member 35 follows because of the mesh of these gears. Fluid presented to the entrance chamber through inlet port 42 is picked up and carried around in the inter-tooth spaces of the intermeshing gears to a discharge chamber for distribution through exit port 44. Fluid communication from the discharge chamber toward the entrance chamber is substantially prevented as the discharge fluid acts on and urges the floating bearing 48 and fixed bearing 50 into engagement with interior of housing 12 in cavity 14 adjacent the inlet port 42 while at the same time creating a flow communication path in the cavity 14 adjacent the discharge port 44 as is well known in the prior art. However an intermesh volume of fluid is trapped between the teeth that sequentially form chamber 70 as the teeth approach full mesh at point 71 during the rotation of the pair of intermeshing gears 40. This trapped volume of pressurized fluid flows from such chambers 70 through slots 68, 38' and 83 anal 83' provided in bearings 50 and 48 to the discharge chamber. As the intermeshing gears 40 rotate, fluid from the entrance chamber is communicated along flow paths formed in fixed bearing 50 to chamber 66 by way of slots 60, 60', chamfers 57, 59 and slots 62, 64 and along flow paths in the floating bearing 48 to chamber 90 by way of slots 81, 81' chamfers 85, 85' and slots 87, 73. The fluid pressure in chambers 66 and 90 is essentially the same as the fluid at the entrance chamber however the rotation of shafts 32 and 33 can create a suction force that may draw some fluid into these chambers. The discharge fluid pressure caused by the resistance to the flow from the exit port 44 is a function of several variables including speed of rotation and losses produced by the flow of fluid between engagement plane of bearings 48 and 50 and the pair of intermeshing gears 40. The clamping force which holds the floating bearing 48, pair of intermeshing gears 40 and the fixed bearing 50 against end wall 24 is initially the force of spring 107. However as the pair of intermeshing gears 40 rotate, the discharge fluid pressure increases and is continually presented to gap 106. This fluid pressure from the discharge chamber acts on end face 95 of the axial rib 84 to develop a force across the floating bearing 48 which provides a clamping force to seal the entrance chamber from the discharge chamber. In designing pump 10, the area of face 95 on the axial rib 84 can be selected to optimize the clamping force for holding the bearings 48 and 50 in engagement with the pair of intermeshing gears 40.

I claim:

1. A floating bearing assembly for use in a pump which along with a fixed bearing retains a pair of intermeshing gear members in a cavity in a housing, said gear members being rotated by an input torque to sequentially communicate fluid received at an inlet port of an entrance chamber to an exit port of a discharge chamber, said floating bearing assembly being characterized by an oval body, a spacer member and a resilient member located in said cavity, said oval body having a first end and a second end, said oval body having first and second axial bores therein for receiving corresponding first and second shafts of said pair of intermeshing gear members, said first end of said oval body engaging said intermeshing gear members and having a first entrance communication flow path to connect said first and second bores with said entrance chamber, said second end having an axial rib that extends therefrom; said spacer member having a first substantially cylindrical peripheral surface that extends from a first end to a shoulder and a second substantially oval surface that extends from said shoulder to a second end, said second oval surface engaging said axial rib and with said oval body forming a first control chamber between said second end of said spacer member and said second end of said oval body; said resilient member being located in said control chamber for urging said oval body into engagement with said intermeshing gear members while at the same time defining a gap between said shoulder on said spacer member and said axial rib on said oval body, said control chamber being connected through said first and second bores to receive fluid from said entrance chamber while said gap is connected to receive fluid having discharge fluid pressure such that a force is generated across said oval body, said force acting to urge said oval body into engagement with the pair of intermeshing gears to seal the entrance chamber from the discharge chamber.

2. The floating bearing assembly as recited in claim 1 wherein said first end of said oval body is further characterized by an exit communication path through which fluid is communicated to said discharge chamber.

3. The floating bearing assembly as recited in claim 2 wherein said first and second bores in said oval body are characterized by an axial slot that extends from said end to second end to define an extension of said entrance communication flow path to said control chamber.

4. The floating bearing assembly as recited in claim 2 wherein said first end of said oval body is further characterized by chamfers which surround said first and second axial bores to assist in communication of fluid from said entrance communication flow path to said axial slot.

5. The floating bearing assembly as recited in claim 3 wherein said spacer member is further characterized by first and second blind axial bores that are aligned with said first and second bores in said oval body, said first and second axial bores receiving said first and second shafts to assist in locating said intermeshing gear members in said cavity.

6. The floating bearing assembly as recited in claim 5 wherein said spacer member is further characterized by first and second seal means located on said first substantially cylindrical peripheral surface and said second substantially oval surface to assure that said discharge chamber is sealed from said entrance chamber and control chamber.

7. In a pump having a pair of intermeshing gear members retained in a cavity by a fixed bearing and a floating bearing assembly to define an entrance chamber and a discharge chamber, said intermeshing gear members being rotated by an input torque to sequentially communicate fluid received at an inlet port of said entrance chamber to an exit port of said discharge chamber, said floating bearing assembly being characterized by a first oval body, a spacer member and a resilient member, said first oval body being located in said cavity and having a first end and a second end, said first oval body having a first and second axial bores therein for receiving corresponding first and second shafts of said pair of intermeshing gear members, said first end engaging said intermeshing gear members and having a first entrance communication path to connect said first and second bores with said entrance chamber, said second end having an axial rib that extends therefrom; said spacer member having a first substantially cylindrical peripheral surface that extends from a first end to a shoulder and a second substantially oval surface that extends from the shoulder to a second end, said oval surface engaging said axial rib to form a first control chamber between said second end of said spacer member and said second end of said oval body; said resilient member being located in said control chamber for urging said oval body into engagement with said intermeshing gear members while at the same time defining a gap between said shoulder on said spacer member and said axial rib on said body, said first control chamber being connected through said first and second bores to receive fluid from said entrance chamber while said gap being connected to receive discharge fluid pressure such that a force is created across said oval body, said force acting on and urging said oval body into engagement with the pair of intermeshing gears and said pair of intermeshing gears into said fixed bearing to seal the entrance chamber from the discharge chamber.

8. The pump as recited in claim 7 wherein said fixed bearing is characterized by a second oval body located in said cavity, said second oval body having a first and a second end, said second oval body having first and second axial bores therein for receiving said corresponding first and second shafts of said pair of intermeshing gear members, said first end engaging said intermeshing gear members and having a second entrance communication path to connect said first and second bores with said entrance chamber.

* * * * *